US006188776B1

(12) United States Patent
Covell et al.

(10) Patent No.: US 6,188,776 B1
(45) Date of Patent: Feb. 13, 2001

(54) PRINCIPLE COMPONENT ANALYSIS OF IMAGES FOR THE AUTOMATIC LOCATION OF CONTROL POINTS

(75) Inventors: Michele Covell, Los Altos Hills; Christoph Bregler, Berkely, both of CA (US)

(73) Assignee: Interval Research Corporation, Palo Alto, CA (US)

( * ) Notice: Under 35 U.S.C. 154(b), the term of this patent shall be extended for 0 days.

(21) Appl. No.: 08/651,108

(22) Filed: May 21, 1996

(51) Int. Cl.$^7$ .................................................. G06K 9/00
(52) U.S. Cl. ......................... 382/100; 382/107; 382/155; 345/419
(58) Field of Search .................................... 382/294, 209, 382/217, 218, 153, 154, 159, 157, 308, 224, 215, 100, 107, 155; 345/419–421, 430, 436

(56) References Cited

PUBLICATIONS

Fukuhara et al. 3–D Motion Estimation of Human Head for Model–Based Image Coding. International Conference on Image Processing and its Applications. pp. 69–72, Feb. 1993.*
Morishima et al. A Media Conversion from Speech to Facial Image for Intelligent Man–Machine Interface. IEEE Journal on Selected Areas in Communications. vol. 9, No. 4, pp. 594–600, May 1991.*
Lantis et al. A Unified Approach to Coding and Interpreting Face Images. pp. 368–373, Jun. 1995.*
Beier, Thaddeus, "Feature–Based Image Metamorphosis", Computer Graphics, 26, 2, Jul. 1992, pp. 35–42.
Bregler, Christoph et al, "Surface Learning with Applications to Lipreading", Advances In Neural Information Processing Systems 6, pp. 43–50.
Fekete, Jean–Daniel et al, "TicTacToon: A Paperless System for Professional 2D Animation", Computer Graphics Proceedings, Annual Conference Series, 1995, pp. 79–89.
Lantis, A. et al, "A Unified Approach to Coding and Interpreting Face Images", Jun. 20–23, 1995, pp. 368–373.
Moghaddam, Baback et al, "Probabilistic Visual Learning for Object Detection", IEEE, Jun. 20–23, 1995, pp. 786–793.
Pentland, Alex et al, "View–Based and Modular Eigenspace for Face Recognition", Jun. 21–23, 1994, pp. 84–91.

* cited by examiner

*Primary Examiner*—Bhavesh Mehta
(74) *Attorney, Agent, or Firm*—Burns, Doane, Swecker & Mathis, L.L.P.

(57) ABSTRACT

The identification of hidden data, such as feature-based control points in an image, from a set of observable data, such as the image, is achieved through a two-stage approach. The first stage involves a learning process, in which a number of sample data sets, e.g. images, are analyzed to identify the correspondence between observable data, such as visual aspects of the image, and the desired hidden data, such as the control points. Two models are created. A feature appearance-only model is created from aligned examples of the feature in the observed data. In addition, each labeled data set is processed to generate a coupled model of the aligned observed data and the associated hidden data. In the image processing embodiment, these two models might be affine manifold models of an object's appearance and of the coupling between that appearance and a set of locations on the object's surface. In the second stage of the process, the modeled feature is located in an unmarked, unaligned data set, using the feature appearance-only model. This location is used as an alignment point and the coupled model is then applied to the aligned data, giving an estimate of the hidden data values for that data set. In the image processing example, the object's appearance model is compared to different image locations. The matching locations are then used as alignment points for estimating the locations on the object's surface from the appearance in that aligned image and form the coupled model.

59 Claims, 7 Drawing Sheets

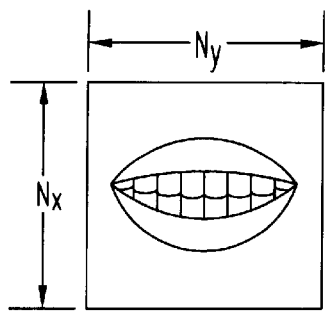
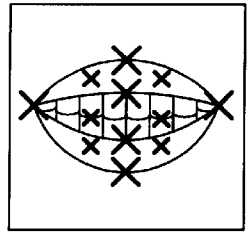
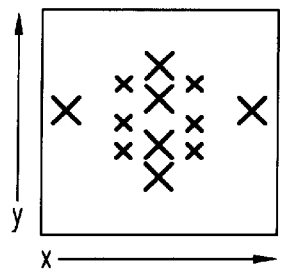
FIG. 1a        FIG. 1b        FIG. 1c
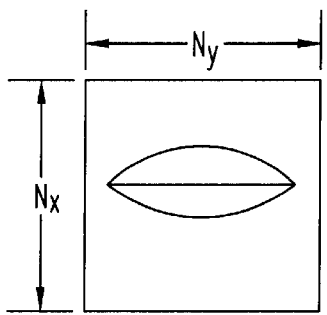
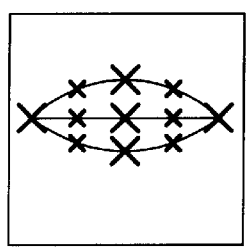
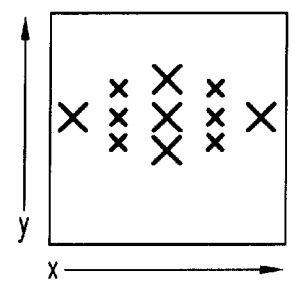
FIG. 2a        FIG. 2b        FIG. 2c
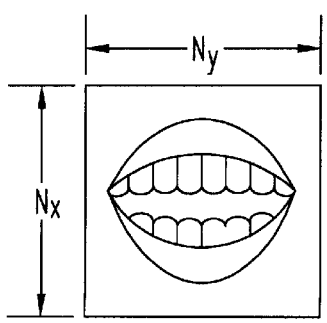
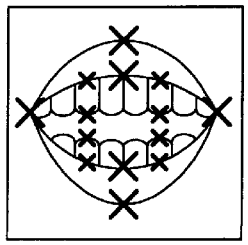
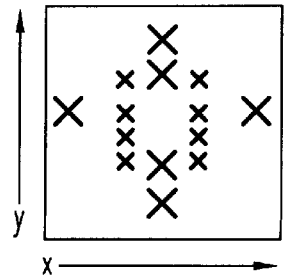
FIG. 3a        FIG. 3b        FIG. 3c

PRINCIPLE COMPONENT ANALYSIS OF IMAGES FOR THE AUTOMATIC LOCATION OF CONTROL POINTS

FIELD OF THE INVENTION

The present invention is directed to data analysis, such as audio analysis, image analysis and video analysis, and more particularly to the estimation of hidden data from observed data. For image analysis, this hidden data estimation involves the placement of control points on unmarked images or sequences of images to identify corresponding fiduciary points on objects in the images.

BACKGROUND OF THE INVENTION

Some types of data analysis and data manipulation operations require that "hidden" data first be derived from observable data. In the field of speech analysis, for example, one form of observable data is pitch-synchronous frames of speech samples. To perform linear predictive coding on a speech signal, the pitch-synchronous frames are labelled to identify vocal-tract positions. The pitch-synchronous data is observable in the sense that it is intrinsic to the data and can be easily derived using known signal processing techniques simply by the correct alignment between the speech sample and a frame window. In contrast, the vocal tract positions must be estimated either using some extrinsic assumptions (such as an acoustic waveguide having uniform length sections with each section of constant width) or using a general modeling framework with parameter values derived from an example database (e.g. linear manifold model with labelled data). Therefore, the vocal tract positions are known as "hidden" data.

In image processing applications, the observable data of an image includes attributes such as color or grayscale values of individual pixels, range data, and the like. In some types of image analysis, it is necessary to identify specific points in an image that serve as the basis for identifying object configurations or motions. For example, in gesture recognition, it is useful to identify the locations and motions of each of the figures. Another type of image processing application relates to image manipulation. For example, in image morphing, where one image transforms into another image, it is necessary to identify points of correspondence in each of the two images. If an image of a face is to morph into an image of a different face, for example, it may be appropriate to identify points in each of the two images that designate the outline and tip of the nose, the outlines of the eyes and the irises, the inner and outer boundaries of the mouth, the tops and bottoms of the upper and lower teeth, the hairline, etc. After the corresponding points in the two images have been identified, they serve as constraints for controlling the manipulation of pixels during the transform from one image to the other.

In a similar manner, control points are useful in video compositing operations, where a portion of an image is incorporated into a video frame. Again, corresponding points in the two images must be designated, so that the incorporated image will be properly aligned and scaled with the features of the video frame into which it is being incorporated. These control points are one form of hidden data in an image.

In the past, the identification of hidden data, such as control points in an image, was typically carried out on a manual basis. In most morphing processes, for example, a suer was required to manually specify all of the corresponding control points in the beginning and ending images. If only two images are involved, this requirement is somewhat tedious, but manageable. However, in situations involving databases that contain a large number of images, the need to manually identify the control points in each image can become quite burdensome. For example, U.S. Pat. No. 5,880,788, discloses a video manipulation system in which images of different mouth positions are selected from a database and incorporated into a video stream, in synchrony with a soundtrack. For optimum results, control points which identify various fiduciary points on the image of a person's mouth are designed for each frame in the video, as well as each mouth image stored in the database. These control points serve as the basis for aligning the image of the mouth with the image of a person's face in the video frame. It can be appreciated that manual designation of the control points for all of the various images in such an application can become quite cumbersome.

Most previous efforts at automatically recognizing salient components of an image have concentrated on features within the image. For example, two articles entitled "View-Based and Modular Eigenspaces for Face Recognition," Pentland et al, *Proc. IEEE ICCVPR '94*, 1994, and "Probabilistic Visual Learning for Object Detection," Moghaddam et al, *Proc. IEEE CVPR*, 1995, disclose a technique in which various features of a face, such as the nose, eyes, and mouth, can be automatically recognized. Once these features have been identified, an alignment point is designated for each feature, and the variations of the newly aligned features from the expected appearances of the features can be used for recognition of a face.

While this technique is useful for data alignment in applications such as face recognition, it does not by itself provide a sufficient number of data points for image manipulation techniques, such as morphing and image compositing, or other types of image processing which rely upon the location of a large number of specific points, such as general gesture or expression recognition.

Other prior art techniques for determining data points from an image employ active contour models or shape-plus-texture models. Active contour models, also known as "snakes", are described in M. Kass, A. Witkin, D. Terzopoulous, "Snakes, Active Contour Models." *IEEE International Conference on Computer Vision*, 1987, and C. Bregler and S. Omohundro, "Surface Learning with Applications to Lipreading," *Neural Information Processing Systems*, 1994. The approaches described in these references use a relaxation technique to find a local minimum of an "energy function", where the energy function is the sum of an external energy term, determined from the grayscale values of the image, and an internal energy term, determined from the configuration of the snake or contour itself. The external energy term typically measures the local image gradient or the local image difference from some expected value. The internal energy term typically measures local "shape" (e.g. curvature, length). The Bregler and Omohundro reference discloses the use of a measure of distance between the overall shape of the snake to the expected shapes for the contours being sought as an internal energy term.

Snakes can easily be thought of as providing control point locations, and the extension to snakes taught by the Bregler et al reference allows one to take advantage of example-based learning to constrain the estimated locations of these control points. However, there is no direct link between the image appearance and the shape constraints. This makes the discovery of "correct" energy functional an error-prone process, which relies heavily on the experience of the user and on his familiarity with the problem at hand. The complete energy functional is not easily and automatically derived from data-analysis of an example training set.

Shape-plus-texture models are described in A. Lanitis, C. J. Taylor, T. F. Cootes, "A Unified Approach to Coding and Interpreting Face Images," *International Conference on Computer Vision*, 1995, and D. Beymer, "Vectorizing Face Images by Interleaving Shape and Texture Computations," *A. I. Memo* 1537. Shape-plus-texture models describe the appearance of an object in an image using shaped descriptions (e.g. contour locations or multiple point locations) plus a texture description, such as the expected grayscale values at specified offsets relative to the shape-description points. The Beymer reference discloses that the model for texture is example-based, using an affine manifold model description derived from the principle component analysis of a database of shape-free images (i.e. the images are pre-warped to align their shape descriptions). The shape model is unconstrained (which the reference refers to as "data-driven"), and, in labelling, is allowed to vary arbitrarily based on a pixel-level mapping derived from optical flow. In the Lanitis et al. reference, both the shape and the texture models are derived separately from examples, using affine manifold model descriptions derived from principle component analyses of a database. For the shape model, the shape description locations (the control point (x,y) locations) are analyzed directly (independent of the grayscale image data) to get the shape manifold. For the texture model, as in the Beymer reference, the example grayscale images are pre-warped to provide "shape-free texture" and these shape-free images are analyzed to get the texture manifold model. In other references, the locations for control points on a new (unlabelled) image are estimated using an iterative technique. First, a shape description for a new image is estimated (i.e. x,y control point locations are estimated), only allowing shape descriptions which are consistent with the shape model. In the Beymer reference this could be any shape description. Then, a "shape-free texture" image is computed by warping the new image data according to the estimated shape model. The distance between this shape-free texture image and the texture model is used to determine a new estimate of shape. In the case of the Beymer reference, the new estimated shape is determined by unconstrained optical flow between the shape-free unlabelled image and the closest point in the texture manifold. The Lanitis reference uses a similar update mechanism with the added constraint that the new shape model must lie on the shape manifold. After iterating until some unspecified criteria is met, the last shape description can be used to describe control point locations on the input image.

Shape-plus-texture methods give estimates for many control-point locations. They also provide well-defined example-based training methods and error criteria derived from that example-based training. However, the models which are derived for these approaches rely on estimates of unknown parameters—they need an estimate of shape in order to process the image data. Thus, they are forced to rely on iterative solutions. Furthermore, the shape- and texture-models do not explicitly take advantage of the coupling between shape and the image data. The models of admissible shapes are derived without regard to the image values and the models of admissible textures is derived only after "normalizing out" the shape model.

When deriving models to allow estimates for unknown parameters, the coupling between observable parameters, such as image grayscale values, and the unknown parameters an the description should preferably be captured, rather than the independent descriptions of the unknown parameters and of the "normalized" known parameters. This is similar to the difference between "reconstructive" models (models that allow data to be reconstructed with minimum error) and "discriminative" models (models that allow unknown classification data to be estimated with minimum error).

BRIEF STATEMENT OF THE INVENTION

In accordance with the present invention, the determination of hidden data from observed data is achieved through a two-stage approach. The first stage involves a learning process, in which a number of sample data sets, e.g. images, are analyzed to identify the correspondence between observable data, such as visual aspects of the image, and the desired hidden data, i.e. control points. With reference to the case of image analysis, a number of representative images are labelled with control point locations relating to features of interest. An appearance-only feature model is created from aligned images of each feature. In addition, each labelled image is processed to generate a coupled model of the aligned feature appearance and the control point locations around that feature. For example, for a coupled affine manifold model, the expected (average) vectors for both the visible image data and the control point locations are derived, from all of the individual vectors for the labelled representative images. A linear manifold model of the combined image deviations and location deviations is also determined from this data. This feature model represents the distribution of visible aspects of an image and the locations of control points, and the coupling relationship between them.

In the second stage of the process, a feature is located on an unmarked image using the appearance-only feature model. The relevant portion of the image is then analyzed to determine a vector for the visible image data. This vector is compared to the average vector for the representative images, and the deviations are determined. These values are projected onto the data model, to identify the locations of the control points in the unmarked image.

In a low-resolution implementation of the invention, certain assumptions are made regarding the correspondence between the visible image data and the control-point locations. These assumptions can be used to reduce the amount of computation that is required to derive the model from the training data, as well as that which is required to locate the control points in the labelling process. The low-resolution approach may be desirable in those applications where a high degree of precision is not required, such as in a low-resolution video morphing or compositing system. In a second implementation of the invention, additional computations are carried out during both the training and labeling steps, to provide a higher degree of precision in the location of the control points. This higher-resolution implementation provides a greater degree of control for processes such as high-resolution video morphing or compositing and the like.

The foregoing features of the invention, as well as more specific aspects thereof which contribute to the practical implementation of the invention under different condition, are explained in greater detail hereinafter with reference to exemplary embodiments illustrated in the accompanying drawings.

BRIEF DESCRIPTION OF THE DRAWINGS

FIG. 1*a* is an illustration of an image of a person's lips in a partially open position and the teeth in a closed position;

FIG. 1b is an illustration of the image of FIG. 1a in which control points on salient portions of the image have been identified;

FIG. 1c is an illustration of only the control points which are identified in FIG. 1b;

FIGS. 2a–2c are illustrations corresponding to those of FIGS. 1a–1c for an image of closed lips and closed teeth;

FIGS. 3a–3c are illustrations corresponding to those of FIGS. 1a–1c for an image of fully open lips and partially opened teeth;

FIG. 4 is an illustration of the generation of the data vectors for the image of FIG. 1a;

DETAILED DESCRIPTION

Figure 4:
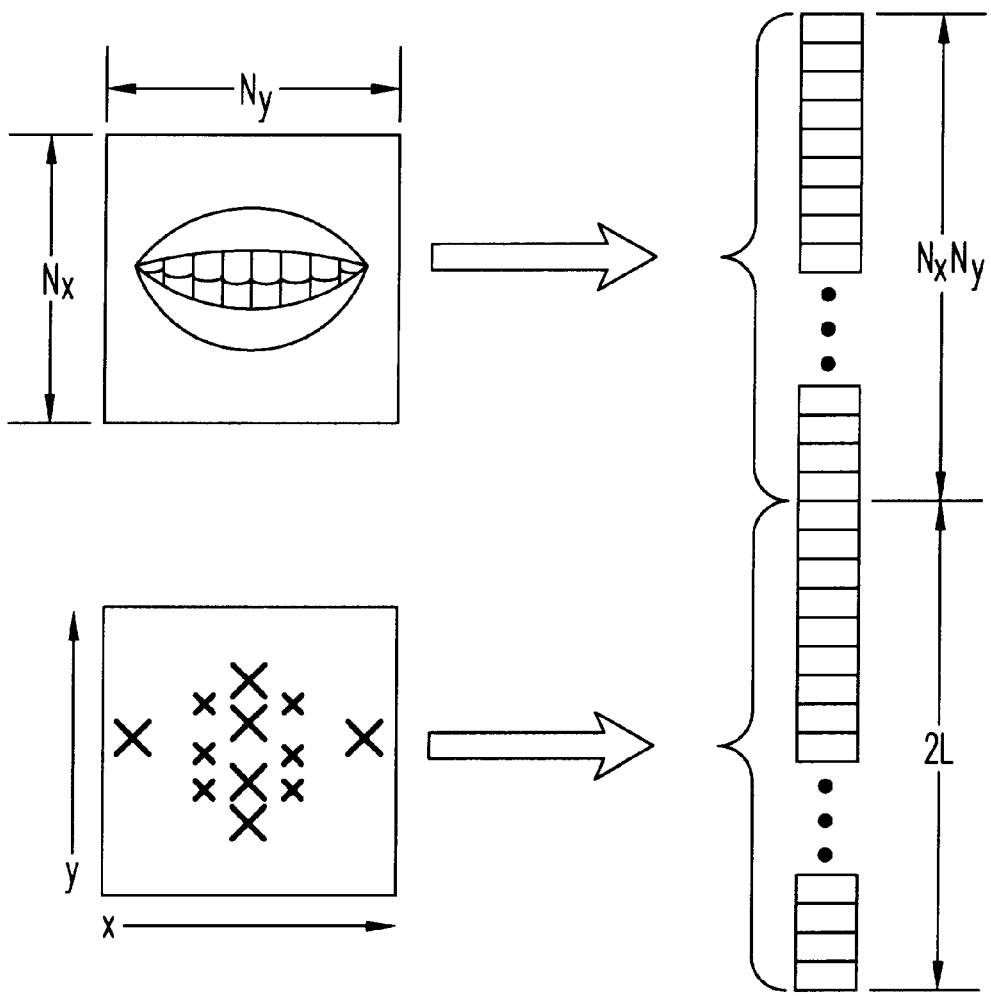

Generally speaking, the present invention is directed to the determination of continuous-valued hidden data from observed data. To facilitate an understanding of the invention, it will be described hereinafter with reference to the specific task of placing control points on unmarked two-dimensional images. Control points are locations on an image that are estimated as best corresponding to fiduciary points on an object. For example, if an object of interest is a face, an outside corner of the lips might be designated as one fiduciary point on the face. A control point marks the image location which is the best estimate of where the outside corner of the lips appears in the image of the face.

The ability to automatically estimate control-point data on unmarked images provides a number of different opportunities for image processing. For example, it can be used to locate control points for applications such as expression and gesture recognition, image morphing, "gesture-based" manipulation of video imagery, and image segmentation and recomposition. It also provides a method for matching fiduciary points in images of distinct but related objects by matching each image separately to one or more models of the appearance of object features. In addition, the results of the present invention can be used to define and align features which are sought in the imagery. As another example, the labelled control points in an image can be used as the basis for controlling physical operations, such as guiding a robotic arm in grasping an object which appears in a real-time image.

In the following description of examples of the invention, reference is made to features on a face as the bases for fiduciary points. It will appreciated that the references to various points on a face are merely exemplary, to facilitate an understanding of the invention, and do not represent the only practical implementation of the invention. Rather, the principles of the invention can be applied in any situation in which it is desirable to automatically identify hidden data, such as control points, from observed data within a set of data, or a subset thereof.

In practice, the present invention is carried out on a computer that is suitably programmed to perform the tasks described hereinafter, as well as the ultimate data processing operation that is desired from the hidden data, such as image morphing. The details of the computer itself, as well as the ultimate data processing steps, do not form part of the invention, and therefore are not described herein. Generally speaking, the data to be processed is stored in suitable memory within the computer, e.g. random access memory and/or a non-volatile storage medium such as a hard disk, and can be displayed on one or more monitors associated with the computer, reproduced via audio speakers, or otherwise presented in a perceptible form that is appropriate to the specific nature of the data.

FIG. 1a illustrates an example of a representative image from a database of training images, which might be displayed on a monitor and which is to be labeled with control points. In this particular example, the image is that of a human mouth, and shows the lips slightly parted with the teeth closed. The image is comprised of $N_x \times N_y$ pixels, and could be a portion of a much larger image, such as a portrait of a person's face.

Within the larger image, the pixels pertaining to the subimage of the mouth could be in a variety of different positions, depending upon where the image of the face appears in the scene, the tilt of the person's head, and the like. In this condition, the pixel data pertaining to the subimage of the mouth is considered to be unaligned. The first step in the location of the control points, therefore, is to align the subimage of the mouth within an $N_x \times N_y$ window of pixels.

The extraction of a subimage, such as a mouth, from an overall image might be carried out with a number of different approaches. In one approach, a feature of interest is first identified in the image, for example by using the feature recognition technique described in the previously cited articles by Pentland et al and Moghaddam et al. Once the feature is identified, it is then aligned within an $N_x \times N_y$ window of pixels. This subimage is then marked by the user with the control points which lie in the mouth area. In another approach, all of the control points in the overall image are first identified. Groups of control points can then be used to locate a feature of interest. In the immediately following discussion of one embodiment of the invention, it will be assumed that each subimage comprises a feature that has been first identified and aligned within an $N_x \times N_y$ window, so that the feature appears consistently at the same location from one subimage to the next. Subsequently, procedures for identifying features from automatically determined control points will be described.

The control points are labelled in the representative images by the user, for example by using a pointing device for the computer such as a mouse and cursor or a pen. Some illustrative control points for the image of FIG. 1a are identified in FIG. 1b. These control points are located at the corners of the mouth, and at the inner and outer edges of both the upper and lower lips, at the centers thereof. Control points are also placed at the top and bottom edges of the upper and lower teeth which are located one tooth to the left and one tooth to the right of the center teeth. It is to be noted that the top edge of the upper teeth and the bottom edge of the lower teeth are not visible in FIG. 1a, and therefore the locations of these control points are estimated by the user. FIG. 1c illustrates the control points by themselves. The location of each control point within the image can be designed by means of x and y coordinates in the pre-aligned subimage.

FIGS. 2a–2c and 3a–3c illustrate two other representative pre-aligned subimages, with their corresponding control points identified. For ease of understanding, all of the examples of FIGS. 1, 2 and 3 are of the same scale. This can be achieved by resampling the images, as needed. In the image of FIG. 2a, both the mouth and teeth are closed, so that the control points for the inner edge of each of the upper and lower lips coincide with one another, and all of the teeth are hidden. In the representative image of FIG. 3a, the mouth is open wider than in FIG. 1a, so as to reveal more of the teeth, and the teeth themselves are partially open.

To generate a model which is used to automatically label control points on other, unmarked images of a human mouth, the representative pre-aligned subimages and their control-point locations are analyzed to generate a joint model of their expected values and of their expected coupled variations. As a first step in the analysis, an image data vector is generated for each representative pre-aligned subimage. In the examples of FIGS. 1a, 2a and 3a, each subimage is an $N_x \times N_y$ array of pixels. Referring to FIG. 4, an image data vector $f_1$ for the image of FIG. 1a is formed by a linear concatenation of the data values for all of the pixels in the image, to thereby form a vector of length $N_x N_y$. An optional processing step on each image data vector can be included to normalize the amplitude of the vector. This step may be required if there are significant brightness variations between the different images in the database. The data values that constitute the vector $f_1$ can represent grayscale values, color, hue, saturation, or any other perceptible attribute of an image. In the following discussion, specific reference will be made to grayscale values, but it will be appreciated that any other qualifiable value or vector of values can be used as well.

In essence, each pixel value represents one dimension of an $N_x N_y$ dimensional vector. A similar vector $p_1$ is formed for the designated control points. If the number of control points is identified as L, and each control point is represented by two values, namely its x and y coordinates, the vector for the control points will have a length of 2L. Similar vectors $f_2$, $f_3$ and $p_2$, $p_3$ are calculated for each of the representative images of FIGS. 2a and 3a.

Figure 5:
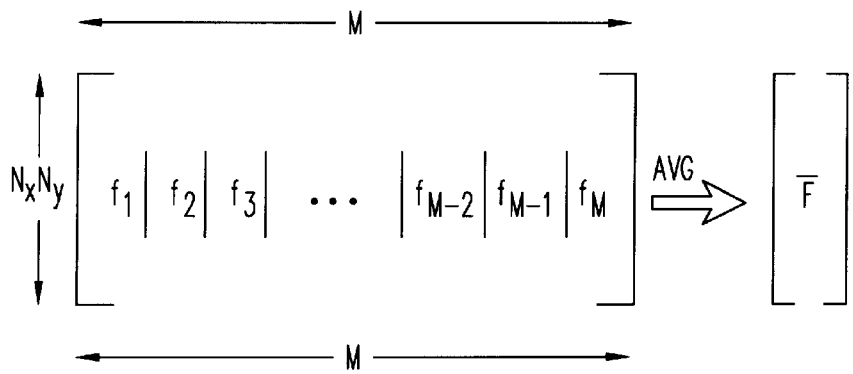
FIG. 5 is an illustration of the manner in which the average value vectors are determined.

After the vectors have been determined for each of the individual images, an average vector is computed, as depicted in FIG. 5. In the example of FIG. 5, the total number of representative images is M. For the image data, the average vector $\bar{F}$ contains $N_x N_y$ elements, each of which is the average of the grayscale value for a corresponding pixel location in each of the representative pre-aligned subimages. In a similar manner, an average vector $\bar{P}$ is computed for the 2L control point values of all the representative images.

Using the average vector $\bar{F}$ for the image data, an example image-variation matrix F can be created by removing the bias from the individual image vectors and combining the result into a matrix, as follows:

$$F=[(f_1-\bar{F})(f_2-\bar{F}) \ldots (f_M-\bar{F})].$$

Figure 6:
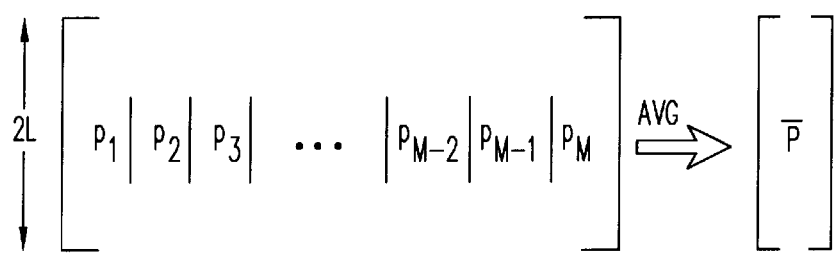
FIG. 6 is an illustration of the deviation matrices.

This matrix is depicted in FIG. 6. In a similar manner, a matrix of control point location variations can be created as follows:

$$P=[(p_1-\bar{P})(p_2-\bar{P}) \ldots (p_M-\bar{P})].$$

The combined matrix $$\begin{bmatrix} F \\ P \end{bmatrix}$$

completely describes the observed coupled variations in the pre-aligned representative images and the control point locations. Each observed variation of the subimage data from $\bar{F}$, the expected image-data values, appears in the top $N_x N_y$ rows of each column. Each corresponding observed variation of the control-point locations from $\bar{P}$, the expected control point-location values, appears in the bottom 2L rows of the same column.

The model that is used to generalize from these observed, coupled variations is a linear manifold model. More specifically, this model is linear in the variations themselves, and affine in the original average-biased data. If K is defined as the dimension of the linear manifold model, where $K \leq M$, $K < N_x N_y$, then the best model for the observed coupled variations, in the least-squares sense, is given by the first K left singular vectors of the singular value decomposition (SVD) of $$\begin{bmatrix} F \\ P \end{bmatrix},$$

. For a definition of an SVD, and a discussion of some of its properties, reference is made to G. H. Golub, C. F. Van Loan, "Matrix Computations," 2nd edition, John Hopkins University Press, 1989, pp. 70–85, 427–436 and 576–581.

Using these definitions and algorithms for computing the SVD, $$\begin{bmatrix} F \\ P \end{bmatrix} = \begin{bmatrix} U_F | \\ U_P | \end{bmatrix} U_\perp \begin{bmatrix} \Sigma & O \\ O & \Sigma_\perp \\ O & O \end{bmatrix} [V \; V_\perp]^H$$

where $$\begin{bmatrix} U_F \\ U_P \end{bmatrix}$$

are the most significant K left singular vectors, $U_F$ is an $(N_x N_y \times K)$ matrix, $U_P$ is a $(2L \times K)$ matrix and $U_F{}^H U_F + U_P{}^H U_P = I$. The superscript "H" refers to the Hermation transpose of the preceding matrix or vector. The vectors $$\begin{bmatrix} U_F \\ U_P \end{bmatrix}$$

give a basis for the best-fitting K-dimensional linear manifold that describes the observed coupled variations. The diagonal elements of $\Sigma$ give the expected strengths of the variations along each of those K directions. The size of the residual error between the observed coupling variations and the K-dimensional manifold model is $$\sqrt{\sum \sigma_{\perp i}^2}$$

where $\{\sigma_{\perp i}\}$ are the diagonal elements of $\Sigma_\perp$. If a K-dimensional linear manifold model is the best description of the coupling between the grayscale variations and the control-point locations, then this residual error is a measure of the noise in the coupled variations.

The average value vectors $\bar{F}$ and $\bar{P}$, along with the matrices describing the most significant K left singular vectors of the coupled deviations, $U_F$ and $U_P$, form affine manifolds that constitute a feature model which captures the coupling between the observable dimensions in the image, namely its grayscale values, and the hidden dimensions, i.e., the locations of the control points.

In addition to this coupled manifold model, the pre-aligned representative subimages can be used to derive a model of the feature's appearance which is used in the labelling stage for locating the feature as a whole. One possible model for the feature's appearance is an affine manifold model, such as described in the previously cited references by Pentland et al. and Moghaddom et al.

Another possible model for the feature's appearance is to use the image portion of the coupled manifold model, namely $\bar{F}$ and $U_F$, along with the corresponding coupled singular values $\{\sigma_i\}_{i=i\ldots k}$=diag ($\Sigma$). This manifold model gives lower detection and localization performance on the training data than can be achieved by the affine manifold models derived as disclosed in the Moghaddam et al. reference. However, in some circumstances, this drop in performance will be small. Use of this model, instead of an independently derived model, reduces the amount of computation required, both in the training stage and in the labelling stage. These computational savings come from the re-use of earlier model computations. The cases when the error introduced by this approximation is likely to be low are when the signal-to-noise in the image portion of the combined (image+location) matrix is much larger than that in the control point-location portion, and the number of dimensions in the image portion of the combined (image+location) matrix is much larger than that of the control-point location portion.

Other alternatives for feature-appearance models include radial-basis-function models, such as reported in K. K. Sung, T. Poggio, "Example based learning for view-based human face detection", *Proc. Image Understanding Workshop*, Vol. II, p. 843–850, 1994; neural-net models, such as reported in H. Rowley, S. Baluja, T. Kanade, "Human Face Detection in Visual Scenes," CMU-CS-95-158, 1995; or distance-to-nearest-example models, which simply retain all the examples as its model.

These two models, one for the feature's appearance and the other for the coupling between appearance and control point locations, can be used to determine the location of control points in an unmarked image. Basically, this process is completed in two steps. The first step is location of the overall feature within the image. The second step is estimation of the control point locations from the observed variations within the feature's subimage. Each step will be described in turn.

The details of the feature location process depend on the method chosen. For most of the methods mentioned previously (optimal subspace methods, radial-basis-functions methods, neural net methods) there is a "location" technique described within the same publications as describe the model itself. These methods will therefore not be discussed further herein. The "location" technique for distance-to-nearest-example is extremely straightforward. This distance is examined for each potential location (e.g. each pixel location) and the locations where this distance is smaller than some threshold are selected as potential feature locations. Non-maximal suppression on neighboring selected locations can be used to avoid "clouds" of selected locations around one true location.

Another approach to feature location mentioned earlier is to use the image portion of the coupled model, namely $\bar{F}$ and $U_F$, along with the corresponding singular values $\{\sigma_i\}_{i=l\ldots k}$=diag ($\Sigma$).

Figure 7:
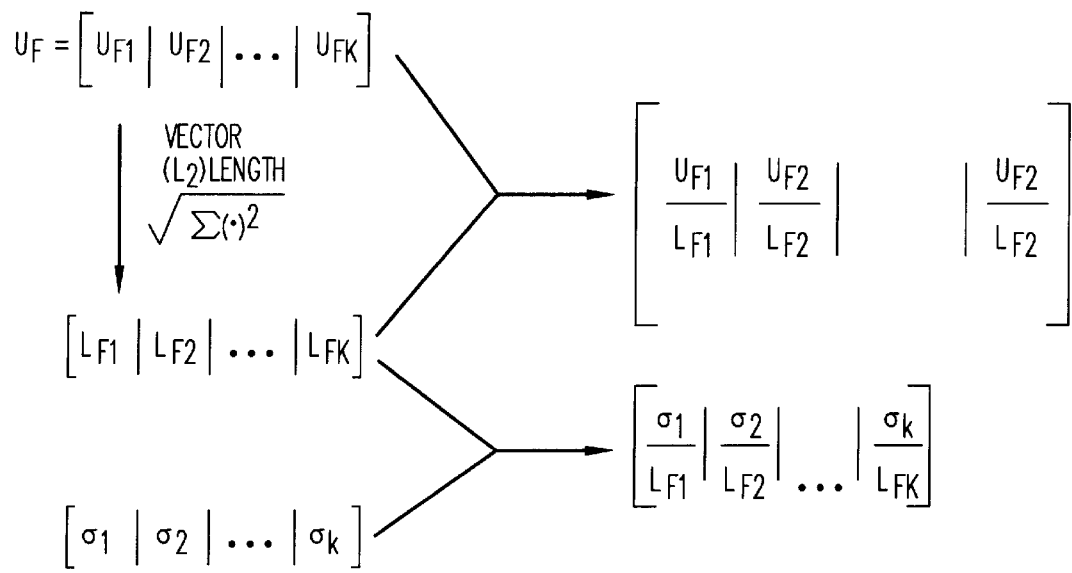
FIG. 7 is an illustration of the manner in which the unit column-norm matrix is computed for the image data vectors.

Under the assumptions mentioned above, where the image-data signal-to-noise ratio is large compared to the control point-location-data signal-to-noise and many more image-data dimensions ($N_x N_y$) exist than control point-location dimensions (2L), the manifold basis vectors, $U_F$, will be nearly orthogonal to one another. A unit norm can be enforced on each of the column vectors, as shown in FIG. 7. Referring to FIG. 7, the singular values are also rescaled using the original vector lengths, $L_F$, to give an estimate of the expected strength in image-only variations along each of the manifold axes. These re-normalized manifold vectors and strengths, $N_F$ and $\{\sigma_{Fi}\}$, along with the bias estimate, F, can be used as described in the Pentland and Moghaddam references, in place of the optimal manifold model. The feature location procedure, after this model replacement, is the same.

When the feature-appearance model that is used is a linear manifold model, such as disclosed in the Pentland et al. reference, or as determined from the image portion of the coupled model, projections and interleaved selection of regions of possible feature locations can be used to reduce the amount of computation required for feature location. The following steps describe one procedure for locating a feature of interest:

Step O: During the training stage (when the affine manifold model has been computed) compute and record the following quantities:

$W^2(x,y)$=the squared values of the selection window for the feature, $E_{\bar{F}}=\bar{F}^H\bar{F}$=the energy in the expected feature-appearance vector, $E_{U_i\bar{F}}=U_i^H\bar{F}$=the correlation between the $i^{th}$ the direction defining the manifold space and the expected feature-appearance vector, $F_w(x,y)=w(x,y)$ $\bar{F}$ $(x,y)$=elementwise product of the expected feature appearance with the feature selection window, $U_{i,w}(x,y)=w(x,y)$ $U_i(x,y)$=elementwise product of the $i^{th}$ manifold direction with the feature selection window, for i=1 . . . k.

Force $\sigma_{noise}^2$, the average variance estimate for the directions orthogonal to the manifold, to be less than or equal to min($\sigma_i^2$), the variances along the manifold directions, if necessary.

Set a threshold, $T_{max}$, on the maximum Mahalanobis distance between the expected feature appearance and any image region that could be declared to be an example of that feature.

Step 1: Set i=1

Define $\|D_1\|^2=f^H f+E_{\bar{F}}-2\bar{F}^H f$ at all potential feature locations (typically, all image locations), where f is the $N_x N_y \times 1$ vector corresponding to the windowed pixel values around each potential feature location.

Compute $\bar{F}^H f$ at the potential feature locations using a fast two-dimensional convolution between the image and $F_w(x,y)$.

Compute $f^H f$ at the potential feature locations using a fast 2D convolution between the squared-amplitude image and $W^2(x,y)$.

Define $E_1^2 = 0$

Select regions of interest as those points in the image where $$E_1^2 + \frac{\|D_1\|^2}{\sigma_1^2} < T_{max}^2$$

The result of this step is compute a lower bound on the distance between the expected feature appearance and each potential image region, using the largest expected variation $\sigma_1$. Each potential image region whose lower bound exceeds the threshold distance $T_{max}$ is removed from further consideration, to thereby reduce subsequent computational efforts.

Steps 2 through (k+1):
Increment i
Compute $$C_{i-1} = U_{i-1}^H f - E_{U_{i-1}F}$$

at each point in the current region-of-interest (ROI), namely the current regions of potential feature locations.

Save this as the $(i-1)^{th}$ coordinate of the final projected manifold location at those image points.

Compute $$U_{i-1}^H f$$

at the potential feature locations as the convolution of the image and $U_{i,w}(x,y)$. Use either direct methods or fast methods on rectangularized enclosing regions, as appropriate, to get the value of this convolution on the current ROI.

Compute $\|D_i\|^2 = \|D_{i-1}\|^2 - C_{i-1}^2$

Compute $E_i^2 = E_{i-1}^2 + \frac{C_{i-1}^2}{\sigma_{i-1}^2}$

Select a subset of the current ROI as the new ROI as those points where $$E_i^2 + \frac{\|D_i\|^2}{\sigma_i^2} < T_{max}^2$$

Repeat until i=k+1, with $\sigma_{k+1}^2 = \sigma_{noise}^2$
Use $$E_i^2 + \frac{\|D_i^2\|}{\sigma_{noise}^2}$$

as the estimated squared distance between each image point and the expected feature appearance where l=the maximum increment for which a value of $E_l^2$ was computed at that image location. Use the final ROI as detected feature locations. Reduce the number of detected feature locations using non-maximal suppression on the feature probability, using as a probability model a zero-mean Gaussian on the estimated distances $$E_l^2 + \frac{\|D_l^2\|}{\sigma_{noise}^2},$$

appropriate.

Figure 11:
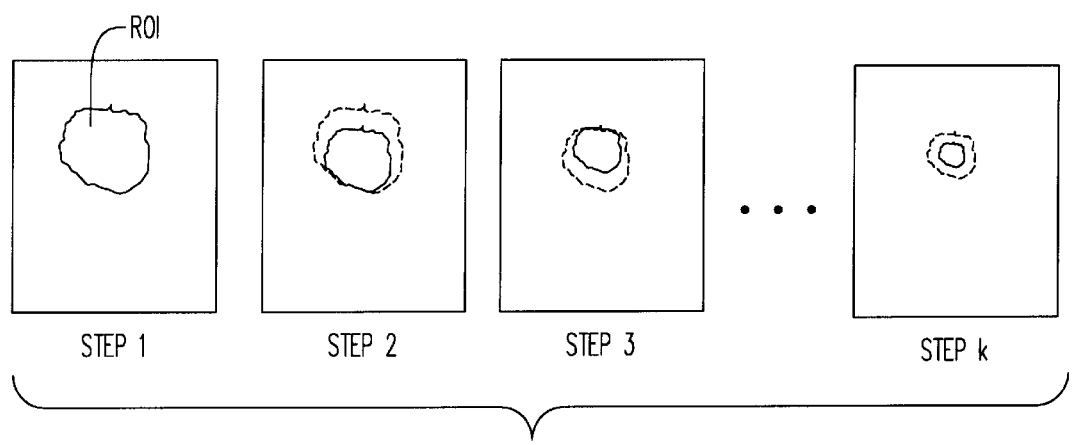
FIG. 11 illustrates the progressive refinement of a region of interest for feature extraction.

This interative approach to finding feature locations functions to compute successively tighter lower bounds on the true Mahalanobis distance between each potential feature location and the expected feature appearance. Since a lower bound is being provided at each step, all regions in which that lower bound is above the maximum allowed distance can be safely ignored. In each step, the lower bound for each remaining ROI is increased through the use of successively smaller divisors (i.e. smaller values of $\sigma_i$). For each ROI whose lower bound is greater than $T_{max}$ in any given step, it is removed from further consideration. Thus, through this iterative approach, the potential image region for each feature is successively reduced, as illustrated in FIG. 11, with the resulting number of computations decreasing on each iteration. The final computations to extract a subimage are therefore carried out over a refined area.

Once the overall location of the feature is estimated, a subimage of that feature is extracted, using the same feature/subimage alignment as was imposed on the training subimages. The coupled manifold model is then used to determine the locations of the control points in a (pre-aligned) unmarked subimage.

As discussed previously, estimating the control point locations from the image data is a specific example of the more general problem of estimating hidden data from aligned observed data. Basically, this process involves the extraction of the hidden data dimensions by projecting the aligned observable data dimensions onto the coupled model. To do so, an aligned data vector f for a new, unmarked data source is determined (e.g. the data vector corresponding to the feature's pre-aligned image), and its difference from the average value vector (f-$\bar{F}$) is computed. This difference vector is then projected onto the coupled manifold, using the left inverse of $U_F$. The hidden data (e.g. the x and y locations for the control points in the new image) are then obtained by projecting from the coupled manifold back into the hidden variables variation subspace (e.g. the control-point-variation subspace) using the matrix $U_P$.

This use of the coupled model components can be best understood by re-examining the implicit from of the coupled manifold. Having chosen a K-dimensional coupled manifold to have the basis $$\begin{bmatrix} U_F \\ U_P \end{bmatrix},$$

, a relation between the aligned observable data (the sub image data) and the hidden data (the control-point) locations) can be imposed such that (f-$\bar{F}$)=$U_F$x and (p-$\bar{P}$)=$U_P$x for some k-dimensional vector x and for the coupled data f and p. Using this model, the best estimate for the control point locations is given by estimating x and then projecting that estimate into the control point space:

$$\hat{p} = \bar{P} + U_P U_F^{-L}(f-\bar{F})$$

where $U_F^{-L}$ is the left inverse of $U_F$ and $\hat{p}$ is the estimate of p.

Due to computational noise issues, the combined projections $U_P U_F^{-1}$ should not be computed using a simple inverse of $U_F$ that is independent of $U_P$. Instead, two alternative approaches are preferred. One alternative uses $N_F$ within an approximation to $U_P U_F^{-1}$. The other alternative uses the known constraint $U_F^H U_F + U_P^H U_P = I$ to find a method for computing $U_P U_F^{-1}$. Each of these two alternatives will be described in turn, followed by discussion of two other possible approaches.

Method 1

Figure 8:
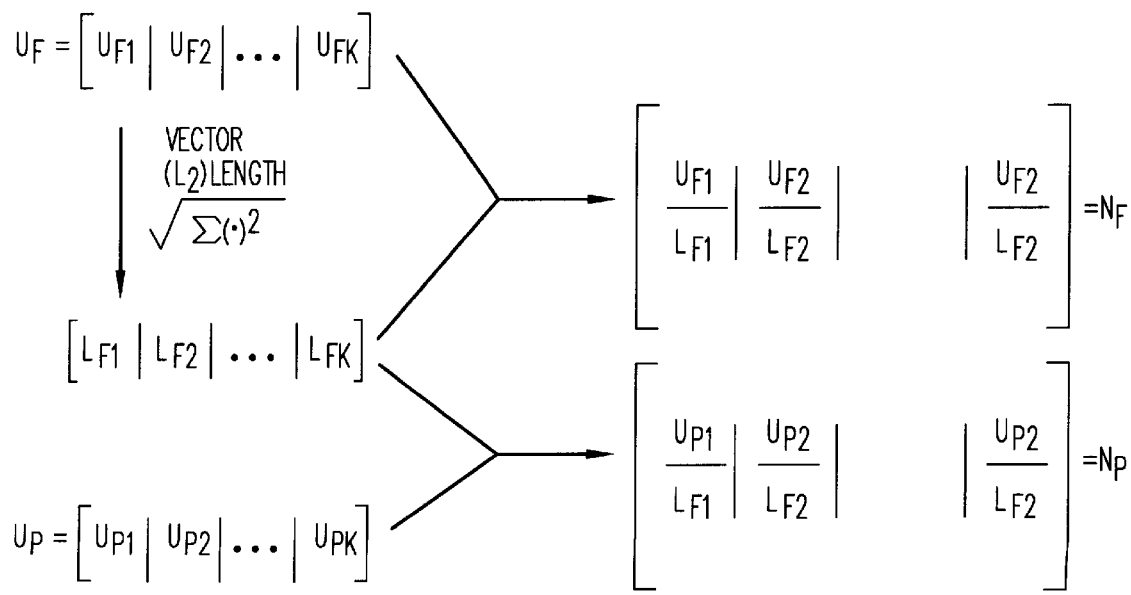
FIG. 8 is an illustration of the manner in which the rescaled control-point manifold matrix is computed from the control-point data vectors and from the column norms of the image data vectors.

If the sub image-data signal-to-noise ratio is large compared to the control-point-location signal-to-noise ratios, and if the number of image dimensional ($N_x N_y$) is much larger than the number of control point dimensions (2L), then $N_F$ can be used within an approximation to $U_P U_F^{-L}$ without introducing much error. These constraints will tend to be satisfied on low-resolution images, where the control point locations are only needed to single pixel accuracy and where the expected size of control point location variations are small (e.g. 5 pixels or less). In this case, $N_F$ is nearly left unitary (i.e., $N_F^H N_F \approx I$) and $U_P U_F^{-L}$ can be well approximated by $N_P N_F^H$ where $N_F$ and $N_P$ are computed as illustrated in FIG. 8. The projection implied by $N_P N_F^H$ should be computed in two steps, in order to retain the computational advantages of (near) orthonormality. First, the image variations (f-$\bar{F}$) should be pre-multiplied by $N_F^H$ and then this new vector should be pre-multiplied by $N_P$. This is offset by a bias $\bar{P}$ to give the estimate of the control point locations.

Step 1: $-N_F^H(f-\bar{F}) = \hat{x}$

Step 2: $\bar{P} + N_P \hat{x} = \hat{\rho}$

This approximation, when used with the ($N_F$, $\bar{F}$) approximation to the optimal appearance-only feature model, has the advantage of reducing the amount of computation needed for control point estimation. This reduction is possible since, in this case, the value of $\hat{x}$ (step 1) is already available from the feature location stage.

Method 2

If greater accuracy is needed than can be achieved with this approximation to $U_P U_F^{-1}$, a well-conditioned approach to computing these projections can be derived from what is called the "C-S decomposition" of ($U_F$, $U_P$).

A constructive definition of the C-S composition is provided by the Matlab® code shown in Appendix A. Using this code the coupled SVD's for $U_F$ and $U_P$ are such that $$U_F = Q_A \Sigma_A V_{AB}^H \text{ and } U_P = Q_B \Sigma_B V_{AB}^H$$

Using this decomposition the combined projection estimate for P is computed in 3 steps:

Step 1 $Q_A^H(f-\bar{F}) = \hat{x}_A$

Step 2 $\Sigma_B \Sigma_A^{-1} \hat{x}_A = \hat{x}_B$

Step 3 $\bar{P} + Q_B \hat{x}_B = \hat{\rho}$

The first step is a rotation onto a lower dimensional space (i.e., an orthonormal transformation). The second step is a simple scale change (i.e., multiplication by a diagonal matrix). The third step is a rotation into a higher dimensional space (i.e., another orthonormal transformation) followed by an offset. All of these operations are well-conditioned. The three steps provide the best estimate of the control point locations, given the coupling model ($U_F$, $U_P$, $\bar{F}$, $\bar{P}$), assuming that coupling model is exact in all K dimensions (i.e., there are no errors in the directions $$\begin{bmatrix} U_F \\ U_P \end{bmatrix})$$

and assuming that the image variations (f-$\bar{F}$) have a high signal-to-noise ratio.

Method 3

Another alternative is appropriate when there are significant amounts of noise in the unmarked, observed data (e.g. the unmarked image which is being labelled). In this case, simply using either of the above approaches to the projection operation will have increased variance due to that noise. In this case, it is important to regularize the estimate of the manifold location $\hat{x}_B$.

Noise in the new, unlabeled image will inflate the estimates of the observed variations, resulting in incorrect control-point estimates. The best linear estimate for the true variations in the manifold subspace will reduce the observed variation estimates by the ratio of the signal to signal-plus-noise on the manifold:

$$\hat{\rho} = Q_B(\Sigma_B \Sigma_A^*) Q_A^H(f-\bar{F}) + \bar{P}$$

where $\Sigma_A^* = (\Sigma_A^2 + \sigma_{noise}^2 \Sigma_A Q_A^T R_{FF}^* Q_A \Sigma_A)^{-1} \Sigma_A$; where $\sigma_{noise}^2 I$ is the variance of the Gaussian iid noise in the image domain; where $R_{FF}$ is the K-D manifold approximation to the feature's (image-only) covariance matrix; and where $R_{FF}^*$ is its Moore-Penrose inverse. Given the relatively low sensitivity of $\Sigma_A^*$ to the details of the regulation function, this is approximated by:

$$\Sigma_A^* \approx (\Sigma_A^2 + \alpha^2 \sigma_{noise}^2 I)^{-1} \Sigma_A$$

where $\alpha^2 = \|\Sigma_A Q_A^T R_{FF}^* Q_A \Sigma_A\|$. This helps to reduce the effect of noise in the observation data while still maintaining the simple projection-scaling-projection sequence.

Method 4

A fourth alternative model avoids forcing the coupling manifold model into a purely K-dimensional subspace. Instead, this model gradually disregards coupling data as the strength of the coupling signal approaches the expected coupling noise. This gradual roll-off of dimensions of the coupling model can be combined with the exact-inverse method (Method 2) or with the regularized-inverse method (Method 3). Gradual roll-off in the analysis (instead of pure truncation of K components) has the advantage of not imposing an artificial dimension on the model. It also weights the observed coupling data by it signal-to-(signal plus noise) ration.

Consider, again, the SVD of the coupled training data $$\begin{bmatrix} F \\ P \end{bmatrix} = \begin{bmatrix} U_{F|} & U_\perp \\ U_{P|} \end{bmatrix} \begin{bmatrix} \Sigma & O \\ O & \Sigma_\perp \end{bmatrix} [V \; V_\perp]^H$$

where K is the number of columns in $U_F$, $U_P$, $\Sigma$ and V. However, instead of selecting a hard cutoff point for K arbitrarily, the error in the coupling data is assumed to be uniformly distributed across all dimensions (image+control point location) and is assumed to be independent across dimensions. Then the best value to pick for K is the integer such that $$\sigma_i^2 > \sigma_{cnoise}^2 \text{ and } \sigma_{\perp i}^2 \leq \sigma_{cnoise}^2$$

where the covariance matrix of the coupling noise is $\sigma_{cnoise}^2 I$, where $\sigma_i = \text{diag}(\Sigma)$ and where $\{\sigma_{\perp i}\} = \text{diag}(\Sigma_\perp)$.

In this case, the estimate for the signal-to-(signal+noise) ratio in the coupling model, itself, is $$\sqrt{\frac{\sigma_i^2 - \sigma_{cnoise}^2}{\sigma_i^2}}$$

for all $\{\sigma_i\}$ and is zero for all $\{\sigma_{\perp i}\}$. The signal-to-(signal+noise) ratio is a good measure of the confidence in the orientation of the estimated coupling dimensions. In particular, if a regularized left inverse on $U_F\Sigma_T$ is used to provide a projection onto the manifold and then $U_P\Sigma_T$ is used to provide a projection into control point variation space, with $$\Sigma_T = \sqrt{\Sigma^2 - \sigma_{cnoise}^2 I},$$

then the resulting control point location estimation equation is $$p = \overline{P} + U_P \Sigma_T \Sigma_T^* U_F^{-L}(f - \overline{F})$$

$$= \overline{P} + U_P \; diag\left(\frac{\sigma_i^2 - \sigma_{cnoise}^2}{\sigma_i^2}\right) U_F^{-L}(f - \overline{F})$$

Using this in the previous "exact-inverse" and the "regularized-inverse" methods, these methods change to Step 1: $Q_A^H(f-\overline{F})=\hat{x}_A$
Step 2: $R_{AB}\hat{x}_A=\hat{x}_B$ (where $R_{AB}$ is no longer diagonal)
Step 3: $P+Q_B\hat{x}_B=\hat{\rho}$ where $V_{AB}$ is the shared right singular vectors of $U_F$ and $U_P$.

Using this in the previous "exact inverse" method (Method 2) gives $$R_{AB} = \Sigma_B V_{AB}^H diag\left(\frac{\sigma_i^2 - \sigma_{cnoise}^2}{\sigma_i^2}\right) V_{AB} \Sigma_A^{-1}$$

Using this in the previous "regularized inverse" method (Method 3) gives $$R_{AB} = \Sigma_B V_{AB}^H diag\left(\frac{\sigma_i^2 - \sigma_{cnoise}^2}{\sigma_i^2}\right) V_{AB} diag\left(\frac{\sigma_{Ai}}{\sigma_{Ai}^2 + \alpha^2 \sigma_{fnoise}^2}\right)$$

Note that, while step 2 is no longer a diagonal matrix, this is still the preferred way to compute the hidden parameter estimates, since typically the manifold will still be the smallest dimensional space in the problem, thus reducing the size of the full, general matrix multiply that is used.

In all the preceding descriptions of coupled model estimation, it has been implicity or explicitly assumed that the expected noise level in the training data is uniform. Typically this is not the case. Bright image areas are typically noisier than dark areas; some control points are harder to accurately mark than other (e.g. corners are easier to mark than the mid-point of a flat contour); and, most especially, the image data is likely to have a very different expected noise level than the control point location data. Therefore, prior to the SVD analysis on $$\begin{bmatrix} F \\ P \end{bmatrix},$$

the coupled data matrix should be normalized to force the expected noise to be uniform. Instead of $$\begin{bmatrix} F \\ P \end{bmatrix},$$

it is preferable to use $$\begin{bmatrix} \tilde{F} \\ \tilde{P} \end{bmatrix} = \begin{bmatrix} T_F^{-1} & 0 \\ 0 & T_P^{-1} \end{bmatrix} \begin{bmatrix} F \\ P \end{bmatrix} T_D^{-1}$$

where $T_F$=diag $\{\sigma_{F1} \ldots \sigma_{FN_xN_y}\}$ and $T_P$=diag $\{\sigma_{P1} \ldots \sigma_{P2L}\}$ are diagonal matrices indicating the standard deviation of the noise in each of the measurement locations and $T_D$=diag $\{\sigma_{D1} \ldots \sigma_{DM}\}$ is a diagonal matrix indicating the expected relative scaling of the measurement noise, from one data set to another.

$$\begin{bmatrix} \tilde{F} \\ \tilde{P} \end{bmatrix}$$

should be used in place of $$\begin{bmatrix} F \\ P \end{bmatrix}$$

in the SVD that is used to determine the coupled manifold model. Similarly, F should be used in training a feature-location model, whichever modeling methods is chosen (e.g. PCA-based model, neural-net-based model, RBF-based model).

To match this pre-scaling of the data used to derive the models, the same pre-scaling should be used on the unmarked image data before feature-location and before control point estimation. For example, assuming that a PCA-based model is used, the image deviations should be renormalized by $T_F^{-1}$. The same change to the input data must be made, whichever feature location method is used under the new noise-variance-normalized feature models.

Similarly, once the feature has been located and a pre-aligned subimage is extracted, the deviations from the expected value should be renormalized, so that $T_F^{-1}(f-\overline{F})$ is used in place of $(f-\overline{F})$. Finally, the estimated control point variations must be rescaled. If the unscaled estimate of the control point variations is $\Delta p$, the new renormalized estimate of the control point location will be $$\hat{\rho}=\overline{P}+T_p\Delta\rho \text{ (instead of } \overline{P}+\Delta p)$$

Within the framework of the earlier notation, this means that the estimate of $\hat{p}$ becomes $$\hat{\rho}=\overline{P}+T_p \text{ "}U_P U_F^{-1}\text{" } T_F^{-1}(f-\overline{F})$$

where "$U_P U_F^{-1}$" is determined by any of the four methods previously described.

In the foregoing description, each feature of an object and the grouping of control points with a feature was implicitly defined. The definition of features, and the grouping of control points, can be carried out in a number of different ways. One approach, described in the references by Pentland et al and Moghaddam et al, is to use manually defined features and, by extension, manually defined groupings of features and control points.

Another alternative is to define the features, either manually, semi-manually, or automatically, and then automatically assign the control points to features. In this case, a "feature location" plus a "feature extent" is required for feature definition. The feature location must be determined for each feature in each training example. The feature extent can be provided once for each feature by a "windowing function" with compact support, i.e. the windowing function equals zero outside some finite-sized region.

One way to derive feature definitions automatically is based on approaches for finding visually distinct areas as described, for example, in J. Shi and C. Tomasi, "Good Features to Track", CVPR, 1994. The techniques mentioned in this reference provide metrics for determining how distinctive different local regions are and how stable they are across aligned images. In the training database, alignment can be provided by using the control points which are already included in the training database. These control point correspondences can then be interpoiated to provide a dense correspondence field using morphing techniques, such as those described in T. Bieir, S. Nealy, "Feature-based Image Metamorphosis", SIGGRAPH 1992.

The techniques of the Tomasi reference provide image locations which are both distinctive and stable. This can be translated into features by "K-means clustering" with a distance metric that includes both the average proximity of the differentiated points and the variance in proximity of the points across the training database. For a description of "K-means clustering", see Duda and Hart, *Pattern Recognition and Scene Analysis,* John Wiley & Sons, 1973, pp. 211–252. Once the differentiated points are clustered, the feature location can be defined as a function of the locations of the clustered distinctive image locations. Any one of the means location, median location (median x and median y) or modal location (the (x,y) bin with the most points, for some bin width) can be used as the function.

The spatial extent of the feature can also be defined either manually or as a function of the clustered distinctive image locations. One possibility is to use a convex hull of clustered locations, with a Hamming-like drop-off perpendicular to the boundary of the hull. Other possibilities include RBF-like windows, where the windowing magnitude drops off as a truncated Gaussian from each of the clustered points, with a hard-limit maximum value of one at each point. Semi-manual definition is also reasonable, since this only requires one basic description (the windowing function) for each feature, instead of a new piece of information one each training image.

Once the features have been defined, manually, semi-manually or automatically, the control points are automatically grouped with the features. Alternative approaches are possible for this grouping as well. A preferred approach employs the following steps:

for a control point which almost always lies within one feature's extent, (e.g. greater than 90% of the examples), and seldom lies within any other feature's extent, (e.g. less than 50% of the examples), the control point is associated with the one feature;

for each control point which lies within the extent of plural features more often than is considered seldom (e.g. more than 50% of the time) the same distance metric is used between the control point and the centers of the features with which it overlaps the required number of times. The feature which exhibits the smallest distance metric is chosen for the control point;

for each control point which does not lie within any feature's extent almost always (e.g. more than 90% of the time) a distance metric is determined between the control point and the centers of all of the features, which takes into account both the average proximity and variance in proximity. The feature with the smallest distance metric is chosen for the control point.

Another alternative for defining features and grouping control points with features is to first group control points and then define a feature to be associated with that group, either semi-manually or automatically. The control points can be first grouped using "K-means clustering" with a distance metric which measures both average proximity and variance in proximity between the control points. Once the control point clusters are defined, the associated feature location is automatically defined as a function of the control point locations in each cluster. Again, mean location, median location or modal location can be employed to define the feature location function. The feature extent can be defined manually or automatically. If defined automatically, it can be determined from either the cluster control point locations only, or both of those locations and differentiated image locations, as described previously. One approach is to take the convex hull of the clustered control-point locations with a Hamming-like drop-off perpendicular to the boundary. Another approach is to include with the cluster all the differentiated points which, in any training image, lie within the convex hull of the clustered control points and to then use the convex hull of this expanded set of points. In this approach, if no differentiated image locations are associated with the clustered control points, then the nearest differentiated image location, in average distance, is added before finding the convex hull.

Another approach to defining features and the control points that are grouped with them is to use a "K-means clustering" on the combined set of control-point locations and differentiated point locations. The distance metric for this clustering again uses average proximity and the variance in proximity, but includes the constraint that at least one control point and at least one differentiated image point must be included in each cluster. The feature location and extent can then be determined automatically from these clusters, in the same ways as described previously.

The above approaches for control point location and for defining feature/control point groupings can also be extended to video inputs and to control point locations over time. For this situation, the first frame of a sequence to be labelled is treated as an isolated image, and is labelled with control points in the manner described previously. For each subsequent frame, the feature location estimate is derived from a feature tracking system, such as those describe din M. Turk and A. Pentland, "Eigen faces for Recognition", *Journal of Cognitive Neurosciences,* Vol. 3, No. 1, 1991, pp 71–86, and J. Woodfill, R. Zabih, "An Algorithm for Real-Time Tracking of Non-rigid Objects, *AAAI*-91, Proc. Natl. Conf. on Artificial Intelligence, 1991, pp. 718–723. The image data which is used to estimate the control-point locations is image data from each of (T-1) prior image frames, plus image data from the current image frame. In each set of data, a subimage is extracted on the basis of an estimated location of the feature in that frame. In addition, the control-point location estimates for the (T-1) frames is included in the observed data. This results in $((T-1)(N_x N_y + 2L) + N_x N_y)$ dimensions of observed data. This data is projected (possibly with regularization) onto the coupled model manifold, and then into the space of current control-point locations. The coupled model manifold is derived from image sequences in the same general manner as the isolated-image coupling models.

In the description given above, each feature is separately located and labeled. With multiple features, mutual information between features can be used to improve the detection and location of each of the features. For example, the fact that the left eye is typically seen above and to the left of the nose can be used to reinforce observations of this configuration of features. One approach which can utilize mutual information between features is to create composite models, which include many or all of the features being sought. An example of this approach is reported in A. Pentland, B. Moghaddam and T. Stanner, "View-Based and Modular Eigenspaces for Face Recognition," CVPR '94, pp. 84–91.

Another way to combine the information given by the manifold match with the information given by the expected relative positions of features is to treat them as independent sources of information that the features is not in a given location. Under this assumption, the probability of that feature is not in a particular location is given by:

$$(1 - P_{total,i}(L_i)) = (1 - P_{Ui}(L_i)) \prod_{j=\text{all features except } i} (1 - P_{i|dist\,j}(L_i))$$

$$P_{i|dist\,j}(L_i) = \sum_{\Delta y} \sum_{\Delta x} P_{Uj}\left(L_i - \left[\frac{\Delta y}{\Delta x}\right]\right) P_{i|j}\left(L_i|L_i - \left[\frac{\Delta y}{\Delta x}\right]\right)$$

where $P_{total,i}(L_i)$ is the final (total) likelihood of feature i at location $L_i$;

$P_{Ui}(L_i)$ is the match likelihood of feature i at location $L_i$, estimated from the affine manifold model of feature i; and $P_{i|dist\,j}(L_i)$ is the probability of feature i being at location $L_i$, base on the match likelihood distribution of feature j.

After some algebraic manipulation, a recursive definition for the total probability is given by:

$$P_{0,i}(L_i) = P_{Ui}(L_i)$$

$$P_{K,i}(L_i) = P_{(K-1),i}(L_i) \quad \text{if } K = i$$

$$= P_{(K-1),i}(L_i) + (1 - P_{(K-1),i}(L_i))P_{i|dist\,K}(L_i) \quad \text{otherwise}$$

$$P_{total,i}(L_i) = P_{N,i}(L_i)$$

where $P_{K,i}(L_i)$ is the likelihood of feature i at location $L_i$, estimated from the match probability of feature i and the relative position information from features j=0 . . . K, omitting i; and N is the total number of related features.

These recursive equations are used in labeling to modify the match likelihood. Based on experimental results, it is also useful to reduce the effect that one feature can have on another feature's distribution as a function of the distance between the two feature. For example, the chin location should not have as a large influence over the forehead location as it does over the mouth location. With enough training data, this diffusion effect is captured in the models of the expected relative positions of the features; the chin/mouth dependency has a much sharper and higher peak than the chin/forehead dependency. However, if limited training data is available, it may be best to explicitly reduce the coupling between distant features by reducing the magnitude of $P_{i|j}(L_i|L_i-D)$ as a function of distance (|D|).

The conditional probabilities relating feature locations, $P_{i|j}(L_i|L_j)$, can be estimated from the training data. This is done by noting that these probabilities are approximately stationary. It is only the offset between the two feature locations which is of significance, not the absolute locations of the features. Using this fact, the conditional probability $P_{i|j}(L_i|L_j)$ can be estimated in the training stage by:

(a) aligning the training images such that the location of feature j is at the origin of the coordinate system;

(b) accumulating the (two-dimensional) location histogram for feature i; and (c) normalizing the histogram values by the total number of training images, to give an estimated distribution of probabilities.

It will be recognized that an increase in the number of samples that are employed in the training stage can lead to a reduction in errors during the labelling stage. If a limited number of training samples is available, the training set can be expanded to provide additional pre-aligned feature images. To this end, a set of "allowed pairings" of images are defined by the user. This set defaults to all M9M-1)/2 combinations of image pairs in the case of an original training set of M isolated images, and to M-1 sequentially neighboring pairs in the case of a training set derived of images extracted from a video sequence.

For each pair in the allowed set, the images are morphed, using the marked control-point locations, to generate an arbitrary, user-defined, number of intermediate images and intermediate control-point locations. These newly-generated images can be used both to extend the example database for feature location and to extend the database for creating a coupled model. A particular advantage of this approach is the fact that each of the newly-generated intermediate images is pre-labelled with the control points, thereby reducing the effort required during the training stage.

The preceding description is based upon the ability of a linear manifold to capture variations in the coupling data across all of the configurations of the feature, appearance and control-point locations for the images in the training database. However, there may be situations in which this assumption is incorrect. In those cases, there will be no single, linear manifold that can capture the important variations. In the past, attempts at solving this type of a problem have resorted to the use of piecewise linear models. See, for example, the previously cited references by Pentland et al and Bregler et al. In some of these approaches, the observed data is projected onto each of the piecewise linear models and is then evaluated to determine which model provides the best fit. In other approaches, the observed data is projected onto a single locally linear model, which is then evaluated to check whether the observed data "belongs" to that linear model. If it does not, the data is reevaluated on other pieces of the model until the best fit is found. In either case, the number of projections which are, or may be, needed grows linearly with the number of linear pieces in the overall model. K-D trees (e.g. quad trees) can be used to reduce the linear growth to logarithmic growth, but the required number of projections nevertheless grows with the complexity of the model.

In the context of the present invention, the number of required projections can be significantly reduced when a piecewise linear model is employed. Rather than being linearly related to the total number of pieces in the mode, the techniques of the present invention keeps the number of projections constant, independent of the total model complexity.

Figure 9:
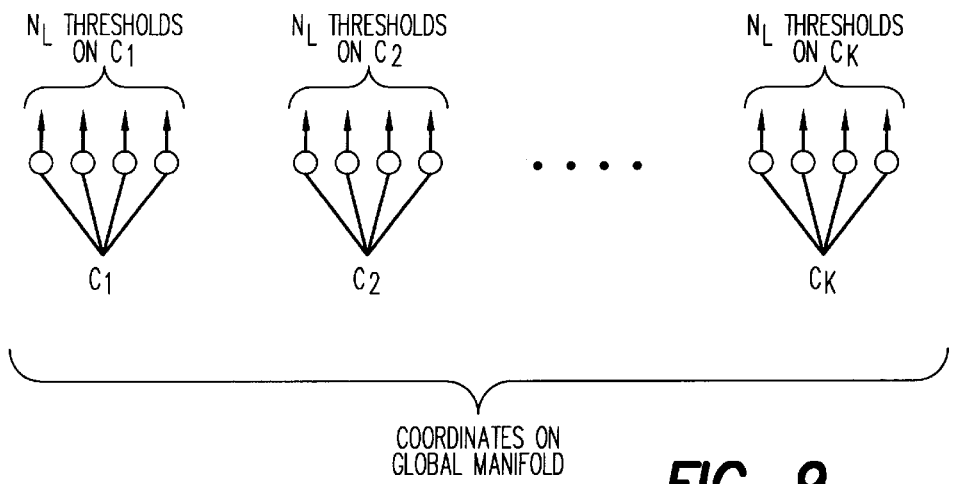
FIG. 9 is an illustration of the inputs to a layer of perceptrons.

More particularly, the data is first modeled by a linear manifold. The coordinates within this linear manifold are quantized, using a scalar quantizer. The quantization boundaries can be selected by training a simple threshold perceptron, with each threshold unit having access to only one dimension of the manifold coordinates. See J. Hertz, A. Krogh, R. G. Palmer, *Introduction to the Theory of Neural Computation,* Addison-Wesley Publishing, 1991, pp. 89–107, for a description of simple perceptrons and their training. In this case, if there are K dimensions in the manifold, the procedure can start with $KN_L$ threshold units, for some arbitrary value $N_L$. The input to each perceptron is simply one of the Kmanifold coordinates (see FIG. 9). The thresholds establish a grid that is used to divide the data into clusters. Each cluster is then used to form a separate linear manifold model. If, after training on the error in the control-point locations, the error is still too large, $N_L$ can be increased, by adding another $K\Delta N_L$ units, and retaining the perceptron. Once the error is acceptable, threshold units can be removed "non-uniformally" across the K dimensions. One procedure for doing so is as follows:

for each of K dimensions, remove one unit from the selected dimension and retrain the perceptron. Measure the final error.

pick the network from the K alternatives with the lowest error.

repeat until no more perceptrons can be removed while still meeting the error bound.

This technique allows non-uniform quantization to be employed in each of the dimensions.

Alternatives to perceptrons for determining grid line placement include global optimization procedures by regular sampling or by statistical sampling (e.g. geneitc algorithms or simulated annealing algorithms).

Figure 10A:
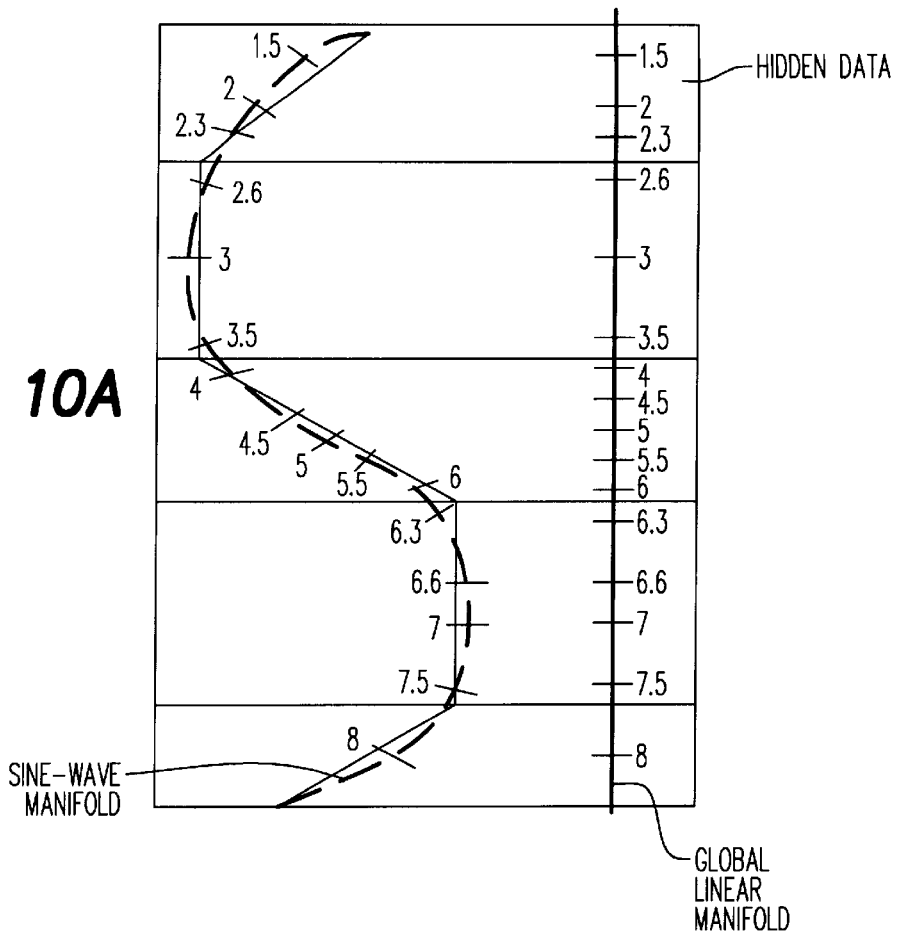
FIGS. 10a–10b illustrate two examples of the mapping of data sets to a global linear manifold.
Figure 10B:
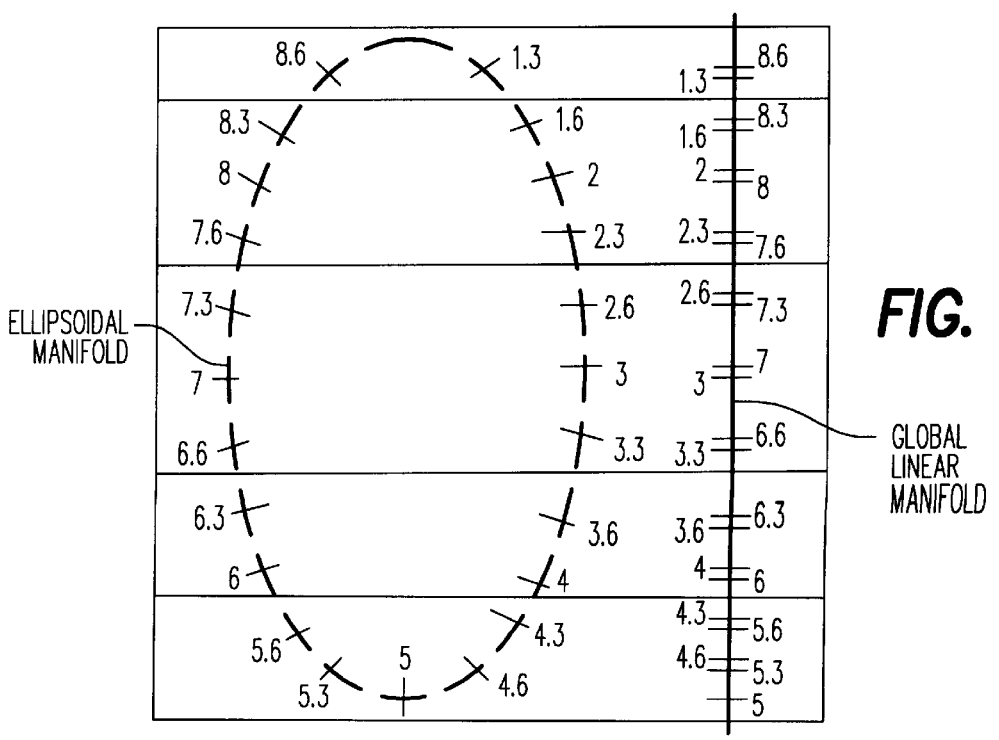

This simple approach will succeed in validly segmenting the training data as long as the data is "sufficiently linear". FIGS 10a and 10b show two illustrative data sets to explain this concept. In these examples, the observed data dimensionality (i.e. $N_x N_y$) is 2, the global manifold dimensionality (i.e. K) is 1 and the hidden data dimensionality (i.e. 2L) is 1. The observed data is the location in the plane. The hidden data is the distance along the dotted curve which has been overlaid on the training data. Referring to FIG. 10a, the sine-wave curve can be well approximated by segmenting the data into non-overlapping regions on the global linear manifold and modeling each data segment using a linear manifold model of the occupying data. As shown in FIG. 10b, however, the ellipsoidal curve cannot be well represented by the same type of segmentation. This is because non-neighboring piecewise linear patches will overlap one another when projected onto the global linear manifold.

One way to correct for this potential difficulty is to allow some regions of the quantized global model to "point ot" multiple alternative piecewise linear models. During labeling, the model which is used to estimate the hidden data from the observations that fall within these multiple-model grid cells is the model with the minimum distance between its appearance-only feature model and the observed data.

In training, deciding whether to introduce another quantization level or to introduce multiple-model cells can be carried out on different bases. Approaches which can be tried include stochastic sampling of the alternatives (e.g. population-based search or simulated annealing algorithms). Alternatively, multiple-model cells can be used if any of the linear dimensions of the cells fall below some threshold. Which of these method is best will depend heavily on the topology of the data set from which the training data was taken.

The gridlines define regions on the global linear coupled manifold. Namely, the training data for each region is sued to create a new linear manifold model of that part of the global linear coupled manifold. However, depending on the distribution of training data, this completely "gridline-defined" division of the training data will result in some regions which have little or no data with which to create a model. Furthermore, since the training data is a sparse sampling of the space, completely disjoint models will result in areas of the global linear manifold which may be vary poorly modelled by local (one-sided) extrapolation. Instead, models can be merged and data-sets extended in the following ways:

Data interpolation across grid cells: The previously described approach of using morphed intermediate examples can be used to create intermediate examples on or near the grid-line boundaries. These examples can be included in the data sets of the cells on either side of the boundary.

Model merging between grid cells: If neighboring grid cells have very similar data (i.e., the error in the control point location using a merged model is below some user-defined bound), then the grid cells should be merged in "best-first" order. If this results in a large number of merged cells, then a hash function can be used to translate grid cell number to model number (reducing the number of look-up table entries according to the hash functions). The hash function should be selected to minimize the number of collisions, where a collision is the number of times identical hash keys which correspond to two or more distinct models are expected to be used. For two or more grid cells with a shared model, having an identical hash is not considered a collision.

With this approach, when a new image is being labelled, only two projections are required for each dimension, one onto the linear model and one onto the appropriate facet of the piecewise linear model.

It will be apparent that extension to this quantized approach include such approaches as linear interpolation of the hidden data estimates between model patches, based on a measure of the distances between the selected model patch and the observed data and between the neighboring model patches and the observed data. These extension are within the scope of the invention described herein.

Figure 12A:
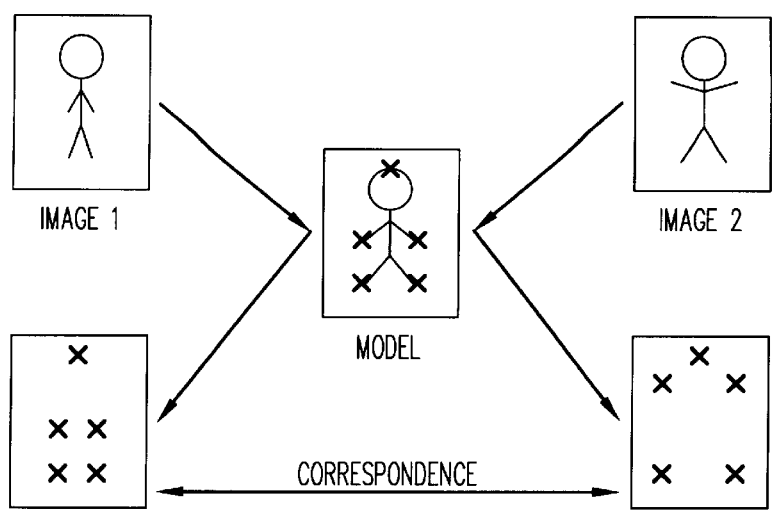
FIGS. 12a–12b illustrate the matching of images by reference to coupled models.

From the foregoing it can be seen that the present invention provides a method for estimating the location of control points on unmarked imagery. Once the control points have been located, the fiduciary points in images of distinct but related objects can be correlated, by matching those images to a model of features of the object, as shown in FIG. 12a. This capability of the invention is related to model-based matching, but differs in the sense that the model is used as an intermediary for matching two distinct images.

Figure 12B:
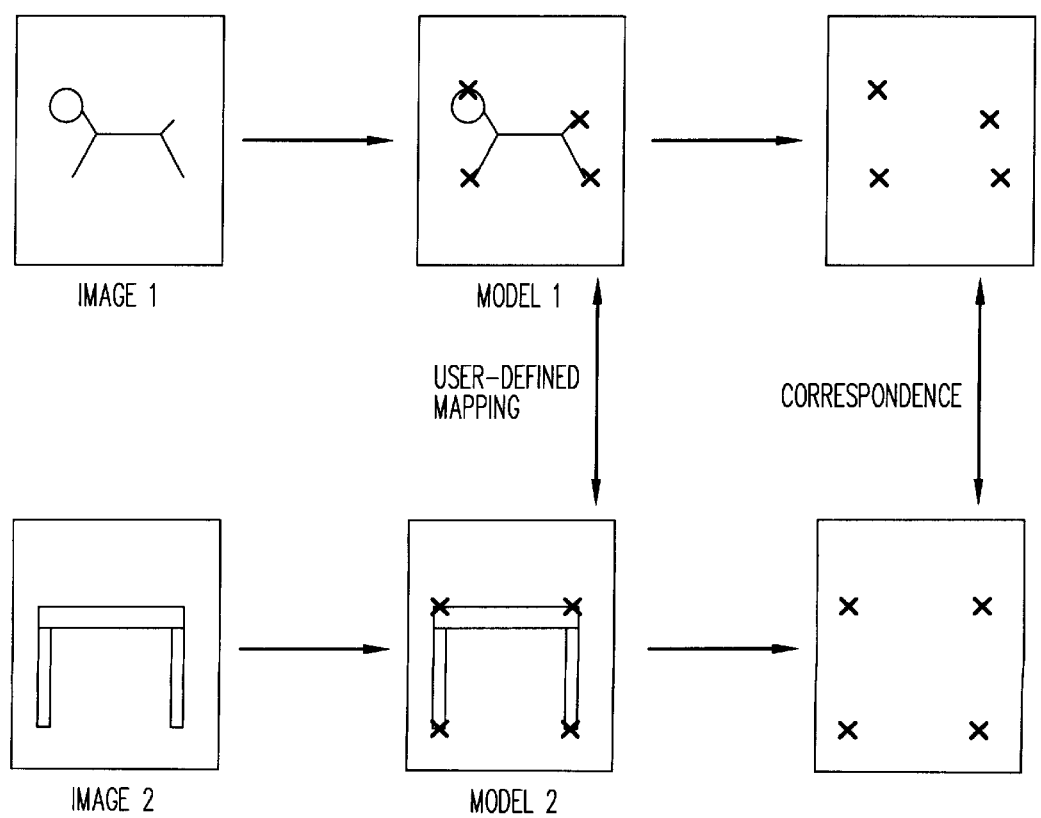

The results provided by the invention can also be used to automatically determine correspondences between images when each image is matched to a separate feature model and when the control-point locations estimated by each of these feature models has a known mapping with control-point locations estimated by the other model. This allows matching of related objects viewed under very different imaging conditions, such as matching a frontal and a profile view of a single or different faces. It also allows matching of unrelated objects using some pre-defined relationship, such as matching a frontal view of a human face to the front view of a car or the side view of a dog's body to a side view of a table, as shown in FIG. 12b.

The results provided by the invention can be used in a number of other applications as well. For example, the automated location of control points can be used to provide much more efficient image manipulation techniques, such as image segmentation and recomposition, and automatic morphing. The invention also facilitates the defining and aligning of features which are sought in imagery, for recognition purposes and the like. For example, control points in a real-time image of an object can be used as a guide to control a robot arm whose task is to grip the object. Other applications include face recognition, gesture recognition, body tracking, image encoding, e.g. compression, pose estimation (as described in Lantis et al, "A Unified Approach To Coding and Interpreting Face Images", *International Conference on Computer Vision,* 1995), and recognition of periodic or nearly periodic motion, such as gait recognition.

It will be appreciated by those of ordinary skill in the art that the present invention can be embodied in other specific forms without departing from the spirit or essential characteristics thereof. For example, although the foregoing discussion was directed to the use of singular value decompositions, it will be appreciated that partial eigen-analysis of the squared matrices can be employed with equal success. Similarly, the principles of the invention are not limited to use on natural images, they can also be employed in connection with graphic images, including images which contain large areas of the same color, such as cartoons. Furthermore, the invention is not limited to use with two-dimensional images. It is equally applicable to one-dimensional data signals, such as the location of vocal tract positions in a speech signal, to perform linear predictive coding. Similarly, it can be applied to video signals, which can be viewed as three-dimensional data since they include the added dimension of time.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

Appendix A

```
% and [s1 s1__]'*q2*v is
%              [r11 r12 ; zeros (s1__'*s2*r22)]
% if p < n, then the last n-p columns of r12 and r22 will be zero
%
if (p > n)
        [pre_u2,q2] = qr(q2,0);
        min_np = n;
else
        min_np = p;
end
[u2, r] = qr(q2(:,1:k));
s = u2' * q2;
% note: k will always be less than min_np
r2 = s(k+1:min_np,k+1:min_np);
[ut, ss, vt] = svd(r2);
s(k+1:min_np, k+1:min_np) = ss;
u2(:,k+1:min_np) = u2(:,k+1:min_np) * ut;
v(:,k+1:min_np) = v(:,k+1:min_np) * vt;
w = (c(k+1:min_np) * ones(1,min_np-k)) .* vt;
[z, r] = qr(w);
if (min_np-k > 1)
        c(k+1:min_np) = diag(r);
```

Appendix A -continued

```
else
        c(k+1) = r(1);
end
u1(:,k+1:min_np) = u1(:,k+1:min_np) * z;
if (min_np > 1)
        s = diag(s);
else
        s = s(1);
end
for (j = 1:n)
        if (c(j) < 0)
                c(j) = -c(j);
                u1(:,j) = -u1(:,j);
        end
end
for (j = 1:min_np)
        if (s(j) < 0)
                s(j) = -s(j);
                u2(:,j) = -u2(:,j);
        end
end
if (p > n)
        u2 = pre_u2 * u2;
        if (full_p ~= 0)
                [z,r] = qr(u2);
                u2(:,n+1:p) = z(:,n+1:p);
        end
end
if (switch_mp == 1)
        z = u1; u1 = u2; u1(:,1:n) = fliplr(u2(:,1:n));
        u2 = z; u2(:,1:n) = fliplr(u2(:,1:n));
        z = c; c = flipud(s); s = flipud(z);
        v = fliplr(v);
end
% Given Q1 and Q2 such that Q1' * Q1 + Q2' * Q2 = I, the
% C-S Decomposition is a joint factorization of the form
%               Q1 = U1*C*V' and Q2=U2*S*V'
% where U1,U2,V are orthogonal matrices and C and S are diagonal
% matrices (not necessarily square) satisfying
%                   C'* C + S'* S = I
% The diagonal entries of C and S are nonnegative and the
% diagonal elements of C are in nondecreasing order.
% The matrix Q1 cannot have more columns than rows.
%
% original code publicly distributed by S. J. Leon
% modifications made by M. M. Covell
function [u1, u2, v, c, s] = csd(q1, q2, full_p)
if (nargin < 3) full_p = 0; end
[m, n] = size(q1); [p, n] = size(q2);
if (m < n)
        error('The number of rows in Q1 must be greater than the
        number of columns');
end
if (m < p)
        switch_mp = 1;
        i = m; m = p; p = i;
        u1 = q1; q1 = q2; q2 = u1;
else
        switch_mp = 0;
end
if (full_p == 0)
        [u1, c, v] = svd(q1,0);
        u1 = fliplr(u1);
else
        [u1, c, v] = svd(q1);
        c = c(1:n,:);
        u1(:,1:n) = fliplr(u1(:,1:n));
end
if (n > 1) c = diag(c); else c = c(1); end
c = flipud(c); v = fliplr(v);
% since q1' * q1 + q2' * q2 = v' * c.^ 2 * v + q2' * q2 = eye
%                q2*v = u * (eye - c.^ 2)
%       where u'*u = eye
%   note that at most the first p columns of q2*v wiil be non-zero
q2 = q2 * v;
% pick out the first k values of c s.t. c(l:k) <= 1/sqrt(2)
% use corrections to the decomposition derived frorn q2*V(:,i:k)
```

-continued

Appendix A

```
% since, in these directions, q2*v will have more energy than q1*v
% and will give better estimates.
%
% for any threshold < 1, k <= p
% for any threshold at all, k <= n
% (force k >= 1, to avoid "empty-matrix" problems)
%
k = 1 + sum(c(2:n) <= i/sqrt(2));
% if the QR decomposition of q2*v is
%               [s1 s2 s2_] [r11 r12; zeros r22 ; zeros]
%                       where r11 & r22 are upper triangular and
                                r12 is general
% then the QR decomposition of q2*v(:,1:k) is
%               [s1 s1_] [r11 ; zeros]
```

Decompose $\Delta f = f - \bar{F}$ into $\Delta f = \Delta f_s + f_n$ where $\Delta f_s$ is the true variation from the expected image data and $f_n$ is the noise in the observed image data with $E[f_n f_n^H] = \sigma_{Fnoise}^2 I$ From the training data, it is possible to estimate $E[\Delta f_s \Delta f_s^H]$ from the SVD of the image data $$F = [Q'_F | Q'_\perp] \begin{bmatrix} \Sigma'_F & 0 \\ 0 & \Sigma'_\perp \end{bmatrix} [V' \; V'_\perp]^H$$

Then $E[\Delta f_s \Delta f_s^H] = (Q'_F(\Sigma'_F{}^2 - \sigma_{Fnoise}^2)Q'_F{}^H = R_{FF}$ assuming that all the diagonal elements of $\Sigma'_F$ are greater than $\sigma_{Fnoise}$.

From estimation theory, the MMSE estimate of $\Sigma_A^{-1} Q_A^H \Delta f_s$ is $(\Sigma_A^2 + (\Sigma_A R_n^2)(R_S^{-2}\Sigma_A))^{-1} \Sigma_A \hat{x}_A$ where $\hat{s}_A = Q_A^H \Delta f$
$R_n^2 = E[Q_A^H f_n f_n^H Q_A] = \sigma_{Fnoise}^2 I$
$R_S^2 = E[Q_A^H \Delta f_s \Delta f_s^H Q_H] = Q_A^H R_{FF} Q_A$ Then, the MMSE estimate of $\Sigma_A^{-1} Q_A^H \Delta f_s$ is $(\Sigma_A^2 + \sigma_{Fnoise}^2 \Sigma_A Q_A^H R_{FF}^+ Q_A \Sigma_A)^{-1} \Sigma_A \hat{x}_A$ where $R_{FF}^+$ is the Moore-Penrose inverse.

What is claimed is:

1. A method for determining continuous-valued hidden data from observable data, comprising the steps of:
   A) conductive a training stage which includes the steps of:
      labelling a plurality of representative sets of unaligned observed data to identify correct alignment of the observed data and continuous-valued hidden data associated with each set of observed data;
      analyzing the observed data to generate a first model which represents the aligned observed data;
      analyzing the aligned and labelled data sets to generate a second model which explicitly represents the coupling between aligned observable data and the hidden data;
   B) for each set of unlabelled data, conducting a labelling stage which includes the steps of:
      analyzing the unlabelled set of unaligned observed data by means of the first model to determine alignment of the observable data associated therewith;
      applying the second model to said unlabelled set of aligned observed data; and
      determining hidden data for the unlabelled set of aligned data from said application of the second model.

2. The method of claim 1 wherein each set of unaligned observed data defines an image.

3. The method of claim 2 wherein said hidden data comprises control points which relate to fiduciary points on objects in an image.

4. The method of claim 3 wherein at least some of said control points relate to fiduciary points on obscured portions of objects in the images.

5. The method of claim 3 wherein control points are determined for at least two new images, and further including the step of morphing between said new images in accordance with the determined control points.

6. The method of claim 3 further including the step of creating a composite image by incorporating a new image into another image by means of the determined control points for each of the two images.

7. The method of claim 3 wherein said images include faces, and further including the step of analyzing the control points to recognize a known face in an image.

8. The method of claim 3 wherein said images comprise cartoons.

9. The method of claim 3 wherein said images include faces, and further including the step of analyzing the control points to recognize an expression on a face in an image.

10. The method of claim 3, further including the step of controlling a robot to grasp an object in accordance with the fiduciary points that are labeled in the image of the object.

11. The method of claim 1 wherein said sets of unaligned observed data comprise a sequence of video images.

12. The method of claim 11 further including the step of analyzing determined control points in said sequence of video images to recognize movement of an object in the images.

13. The method of claim 12 wherein said movement comprises nearly periodic motion.

14. The method of claim 1 wherein said sets of unaligned observed data comprise audio signals.

15. The method of claim 1 wherein said first model is derived from the results of the analysis that is used to generate the second model, such that computations are shared in the use of the two models.

16. The method of claim 1 further including the steps of selecting a plurality of said representative sets of data, using hidden data in said plurality of data sets to automatically generate interpolated data sets that are based on said plurality of data sets and that include both observable and hidden data, and including said interpolated data sets in the plurality of representative data sets that are analyzed to generate said second model.

17. The method of claim 16 wherein said second model is a multifaceted model, and said interpolated data sets are at the boundaries of facets in said second model.

18. The method of claim further including the steps of selecting a plurality of said representative sets of data, using hidden data in said plurality of data sets to automatically generate interpolated data sets that are based on said plurality of data sets and that contain observable data, and including said interpolated data sets in the plurality of representative data sets that are analyzed to generate said first model.

19. The method of claim 18 wherein said first model is a multifaceted model, and said interpolated data sets are at the boundaries of facets in said first model.

20. The method of claim 1 wherein said second model is a manifold model.

21. The method of claim 20 wherein said second model is an affine manifold model.

22. The method of claim 21 wherein the step of applying the second model to the unlabelled set of aligned observed data includes
   performing an orthonormal projection of the aligned observed unlabeled data onto a first space of the second mode;

scaling the coordinates of the projected location in the first space in accordance with said second model; and performing an orthonormal projection into a second space of the second model to determine hidden data for the unlabelled data set.

23. The method of claim 22 wherein said scaling includes modification of the coordinates of said location in accordance with estimated noise levels in the unlabelled aligned observed data set to which said second model is applied.

24. The method of claim 1 wherein said first model is a manifold model.

25. The method of claim 21 wherein said first model is an affine manifold model.

26. The method of claim 24 wherein the step of aligning the observed data in an unlabelled data set comprises the steps of:
  i) selecting possible locations for the alignment of the data;
  ii) for each possible location, determining a lower bound for the distance between the unlabelled data set aligned at that location and an expected appearance of aligned data, in accordance with an average appearance defined by the first model;
  iii) removing the possible locations whose lower bound exceeds a threshold value;
  iv) for each possible location, determining the coordinate value for a dimension of the first model;
  v) for each possible location, determining a new lower bound by combining previously determined coordinate values with the distance between the data set aligned at that location and the appearance of the data set under said alignment in accordance with the previously determined coordinate values; and
  vi) repeating steps iii), iv) and v) for all of the dimensions of the model.

27. The method of claim 26 wherein said lower bounds are determined in accordance with expected variances along each of the dimensions of the manifold model.

28. The method of claim 27 wherein said expected variances are progressively smaller on each successive repetition of said steps.

29. The method of claim 25 wherein the step of applying the second model to the unlabelled set of aligned observed data includes
  projecting, with the use of an orthonormal transform, the aligned observed unlabeled data onto a subspace of the second model having fewer dimensions than said second model;
  performing a general matrix multiplication within said subspace; and
  projecting, with the use of an orthonormal transform, into a second space of the model to determine hidden data for the unlabelled data set.

30. The method of claim 29 wherein said general matrix multiplication is determined, in part, according to a gradual roll-off in manifold dimensions according to relative signal-plus-noise strength in the hidden and aligned observed data that is used to generate said second model.

31. The method of claim 25 wherein the step of applying the second model to the unlabelled set of aligned observed data includes:
  approximating a projection of the aligned observed unlabeled data onto a subspace of the second model by taking the dot product of renormalized basis vectors that correspond to dimensions of the observed data in the second model with the aligned unlabelled observed data; and
  approximating a projection into a second space of the model by using the hidden dimensions of the basis vectors with the same scaling.

32. The method of claim 1 wherein said representative data sets are normalized to provide uniform expected energy across both the hidden and observed dimensions of the aligned data, and said second model minimizes expected error relative to the normalized data set.

33. The method of claim 32 wherein said second model minimizes expected error with respect to hidden data.

34. The method of claim 1 further including the step defining the alignment of the observed data in the representative sets of data from an analysis of the hidden data with which the data sets are labelled.

35. The method of claim 34 wherein an analysis of the observed data is also employed in said alignment process.

36. The method of claim 34 wherein said defining step comprises dividing the hidden data into separate groups, and assigning a different definition of aligned observed data in each representative data set to the respective groups.

37. The method of claim 36 wherein the division of the hidden data into separate groups is determined in accordance with analysis of the hidden data.

38. The method of claim 36 wherein the definition of aligned observed data is determined in accordance with analysis of the hidden data.

39. The method of claim 38 wherein the definition of aligned observed data is also determined in accordance with analysis of the observed data.

40. The method of claim 37 wherein the observed data is also used to divide the hidden data into said groups.

41. The method of claim 37 wherein the division of hidden data into groups is carried out by measuring the coherence of the hidden data.

42. The method for establishing a relationship between at least two unlabelled images, comprising the steps of:
  A) conducting a training stage which includes the steps of:
    analyzing a plurality of representative labelled images to generate a model which identifies specific locations on one or more objects based on pixel values within each image;
  B) for each set of unlabeled images to be compared, conducting a model application stage which includes the steps of:
    matching each of said unlabelled images to the model to identify locations on objects within each unlabelled image; and
    determining correspondence between the unlabeled images based on the identified locations.

43. A method for establishing a relationship between at least two unlabelled images, comprising the steps of:
  A) conducting a training stage which includes the steps of:
    analyzing a first set of labelled images to generate a first model which identifies specific locations on one or more objects based on pixel values within each image of said first set;
    analyzing a second set of labeled images to generate a second model which identifies specific locations on one or more objects based on pixel values within each image of said second set;
    establishing a mapping between identified locations in said first model and identified location in said second model;
  B) for each set of images to be compared, conducting a model application stage which includes the steps of:

matching a first unlabelled image to the first model to identify locations on objects in said first image;

matching a second unlabelled image to the second model to identify locations on objects in said second image; and determining correspondence between the first and second unlabelled images based on the identified locations in each image and said mapping.

44. A method for indexing data into a multi-faceted model using a single-faceted global manifold model to which the data relates, comprising the steps of:

A) conducting a training stage which includes the steps of:

generating a single-faceted global manifold model from a plurality of examples of the data, wherein said global manifold model encompasses all examples of the data;

generating a multi-faceted manifold model from divisions of the examples of data, wherein each facet encompasses a local set of examples of the data;

B) for each new set of data, conducting a model indexing stage which includes the steps of:

applying said global manifold model to the new set of data;

deriving a coordinate vector from said application of the global manifold model to said set of data; and indexing said data into said multi-faceted model from said global manifold model in accordance with said coordinate vector.

45. The method of claim 44 wherein said multi-faceted model is a piecewise affine model.

46. The method of claim 44 wherein said global manifold model is an affine manifold model.

47. The method of claim 44 wherein said coordinate vector is a non-uniform quantization of coordinates of the global manifold model.

48. The method of claim 47 further including the step of merging similar model facets in neighboring quantization sections of said multifaceted model according to a fitness function.

49. The method of claim 48 wherein said multi-faceted model identifies coupling between observable data and hidden data, and said fitness function is based on resulting hidden data error.

50. The method of claim 48 further including the step of using a hashing function to map quantization coordinates into a table index, where the size of the table is smaller than the total number of quantization cells.

51. The method of claim 44 wherein said multi-faceted model is also a manifold model.

52. The method of claim 44 wherein said data comprises observable data in an image.

53. The method of claim 44 wherein said multi-faceted model identifies coupling between observable data and hidden data.

54. The method of claim 53 wherein said multi-faceted model is segmented into spaces which respectively relate to said facets, and wherein said segmentation is based upon coordinates for said single-faceted global model.

55. The method of claim 54 wherein said segmentation is defined by non-uniform quantization of the coordinates of the single-faceted global model.

56. The method of claim 55 wherein boundaries for said quantization are determined according to errors in the reconstruction of hidden data on the multi-faceted model.

57. A model for aligning observed data to a manifold model, comprising the steps of:

i) selecting possible locations for the alignment of the data within an unaligned set of data;

ii) for each possible location, determining a lower bound for the distance between the unaligned data set aligned at that location and an expected appearance of aligned data, in accordance with an average appearance defined by said model;

iii) removing the possible locations whose lower bound exceeds a threshold value;

iv) for each possible location, determining the coordinate value for a dimension of the model;

v) for each possible location, determining a new lower bound by combining previously determined coordinate values with the distance between the data set aligned at that location and the appearance of the data set under said alignment in accordance with the previously determined coordinate values; and vi) repeating steps iii), iv) and v) for all of the dimensions of the model.

58. The method of claim 57 wherein said lower bounds are determined in accordance with expected variances along each of the dimensions of the model.

59. The method of claim 58 wherein said expected variances are progressively smaller on each successive repetition of said steps.

* * * * *